in

US012409770B2

(12) United States Patent
White

(10) Patent No.: US 12,409,770 B2
(45) Date of Patent: Sep. 9, 2025

(54) CONVERSION SYSTEMS FOR CUSTOMIZING STANDARD TRAILERS FOR SPECIALIZED USES

(71) Applicant: Star Leasing Company, LLC, Dublin, OH (US)

(72) Inventor: Donald T. White, Godfrey, IL (US)

(73) Assignee: STAR LEASING COMPANY, LLC, Dublin, OH (US)

( * ) Notice: Subject to any disclaimer, the term of this patent is extended or adjusted under 35 U.S.C. 154(b) by 0 days.

(21) Appl. No.: 18/637,944

(22) Filed: Apr. 17, 2024

(65) Prior Publication Data
US 2025/0050799 A1    Feb. 13, 2025

Related U.S. Application Data

(60) Provisional application No. 63/563,497, filed on Mar. 11, 2024, provisional application No. 63/531,731, filed on Aug. 9, 2023.

(51) Int. Cl.
| | |
|---|---|
| *B60P 7/08* | (2006.01) |
| *B60P 3/00* | (2006.01) |
| *B60P 7/14* | (2006.01) |
| *B60P 7/16* | (2006.01) |
| *B62D 33/04* | (2006.01) |

(52) U.S. Cl.
CPC ............... *B60P 7/14* (2013.01); *B60P 3/007* (2013.01); *B60P 7/0892* (2013.01); *B60P 7/16* (2013.01); *B62D 33/04* (2013.01)

(58) Field of Classification Search
CPC .. B60P 7/14; B60P 7/0892; B60P 7/16; B60P 1/649

USPC .......... 410/87, 88, 117, 129, 141, 142, 155; 293/1
See application file for complete search history.

(56) References Cited

U.S. PATENT DOCUMENTS

| | | | | |
|---|---|---|---|---|
| 2,894,461 A | * | 7/1959 | Nagler .................... | B60P 7/08 410/155 |
| 3,336,069 A | * | 8/1967 | Palmer .................... | B60P 7/16 410/87 |
| 4,815,905 A | | 3/1989 | Garcia, Jr. | |
| 4,880,342 A | * | 11/1989 | Pradovic .................. | B60P 7/14 410/127 |

(Continued)

FOREIGN PATENT DOCUMENTS

| | | |
|---|---|---|
| JP | 2010155557 A | 7/2010 |
| JP | 2011245980 A | 12/2011 |
| JP | 2019055800 A | 4/2019 |

OTHER PUBLICATIONS

The above documents were cited in the were cited in a PCT International Search Report that issued on Nov. 4, 2024, which is enclosed that issued in the corresponding PCT/US2024/039084.

*Primary Examiner* — Stephen T Gordon
(74) *Attorney, Agent, or Firm* — Cowan, Liebowitz & Latman, P.C.

(57) ABSTRACT

A conversion system for modifying internal dimensions of a semitrailer for use in hauling freight, the conversion system comprising a plurality of first bumpers, each of the first bumpers being configured to removably attach to one of first and second opposing sidewalls of the semitrailer, wherein the plurality of first bumpers are configured to reduce an internal usable width of the semitrailer, and wherein the plurality of first bumpers are configured to allow airflow around the freight within the semitrailer.

29 Claims, 13 Drawing Sheets

(56) References Cited

U.S. PATENT DOCUMENTS

| | | | | |
|---|---|---|---|---|
| 5,137,313 A | * | 8/1992 | Teig | B60P 7/16 |
| | | | | 267/140 |
| 5,669,745 A | * | 9/1997 | Anderson | B60P 7/16 |
| | | | | 410/117 |
| 5,752,798 A | * | 5/1998 | Smidler | B60P 3/08 |
| | | | | 410/4 |
| 5,934,850 A | * | 8/1999 | Soumar | B60P 7/15 |
| | | | | 410/155 |
| 2008/0131226 A1 | | 6/2008 | Pesson | |

* cited by examiner

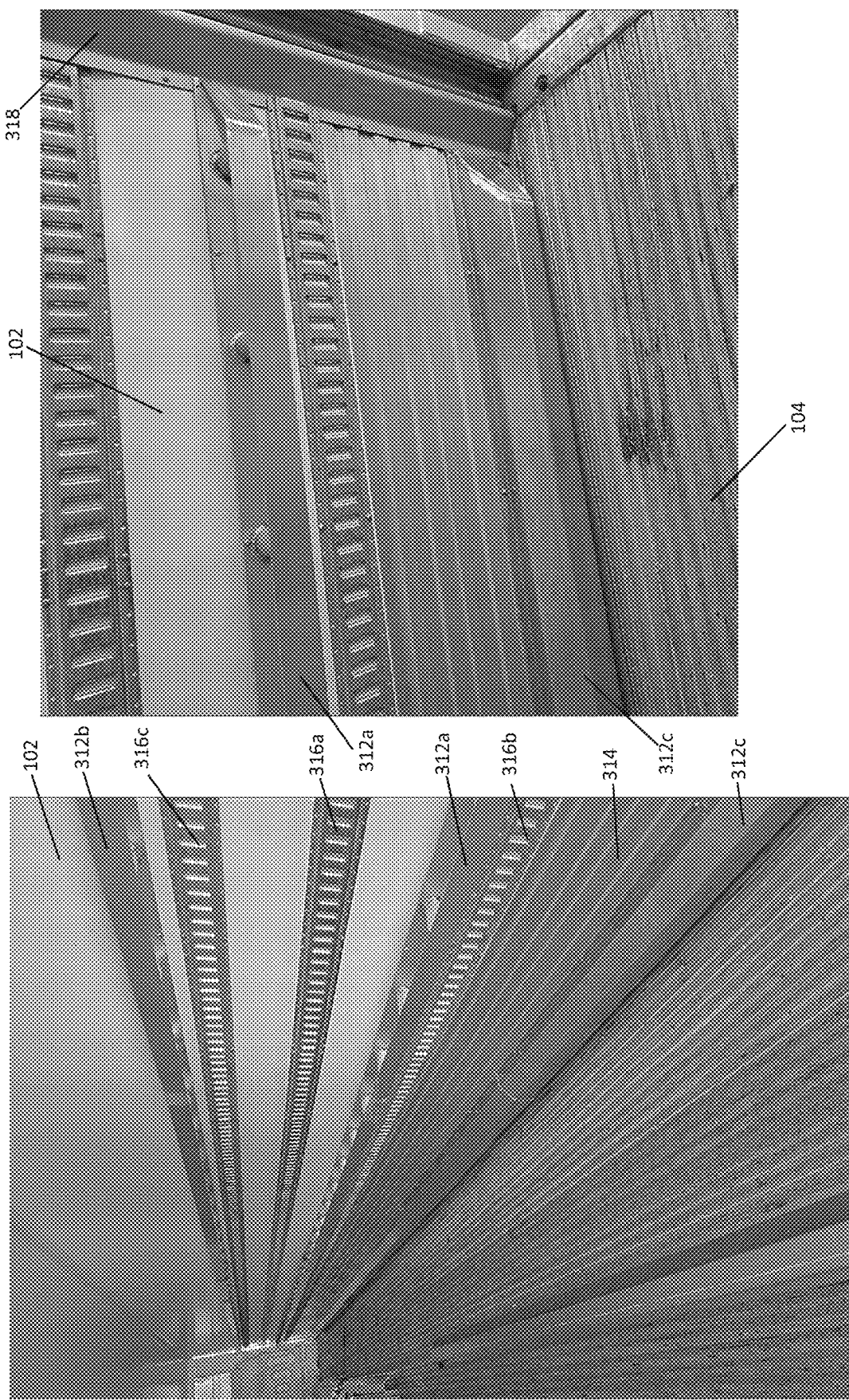

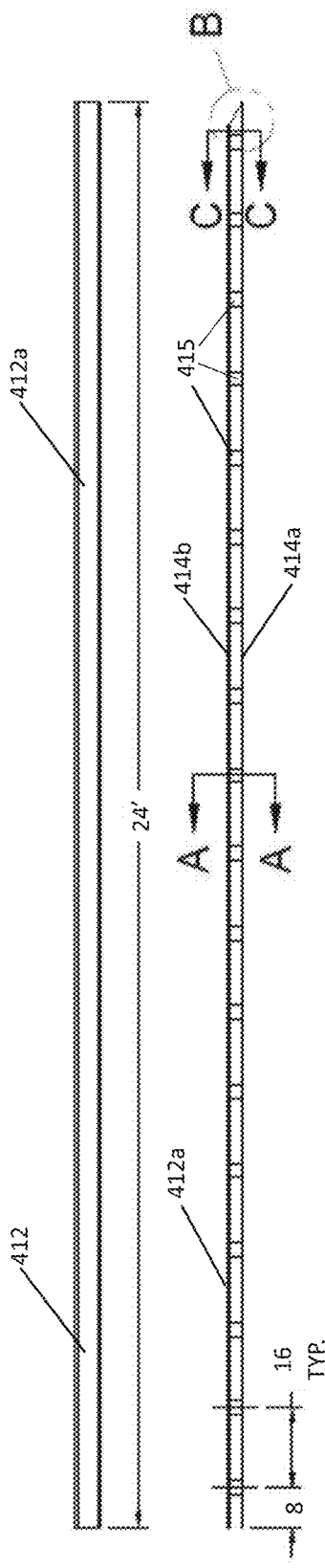
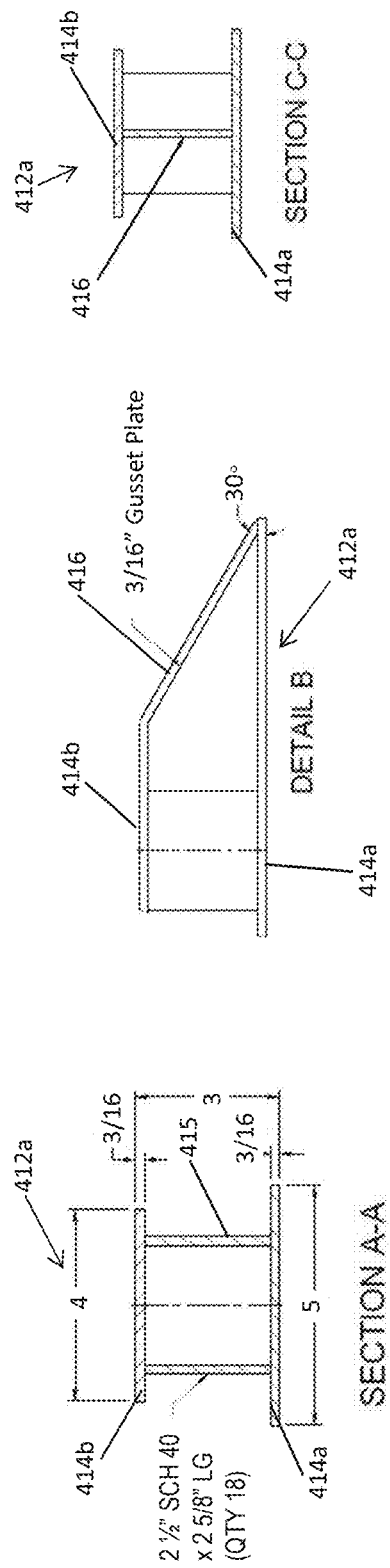
FIG. 5A
FIG. 5B
FIG. 5C
FIG. 5D

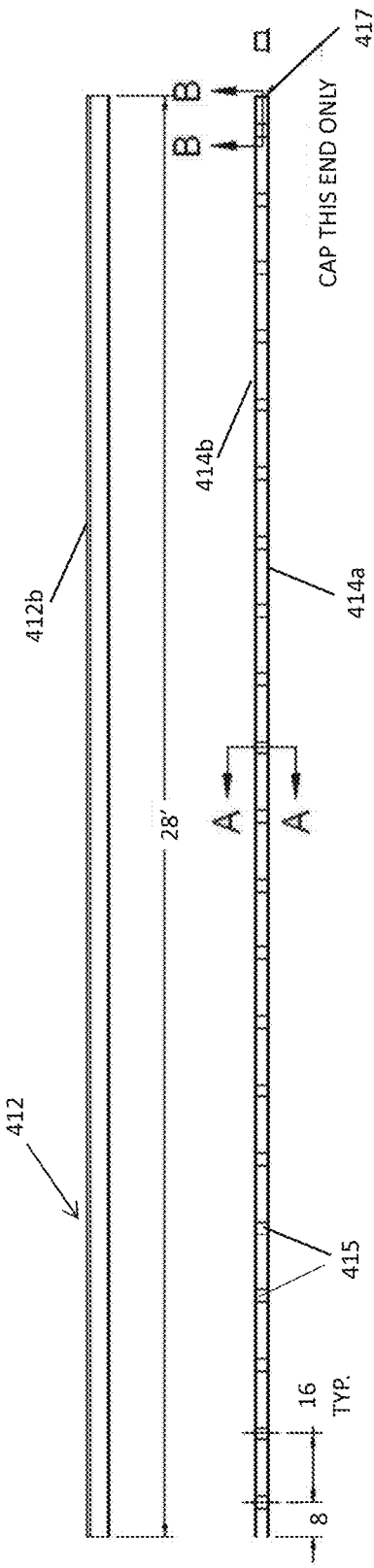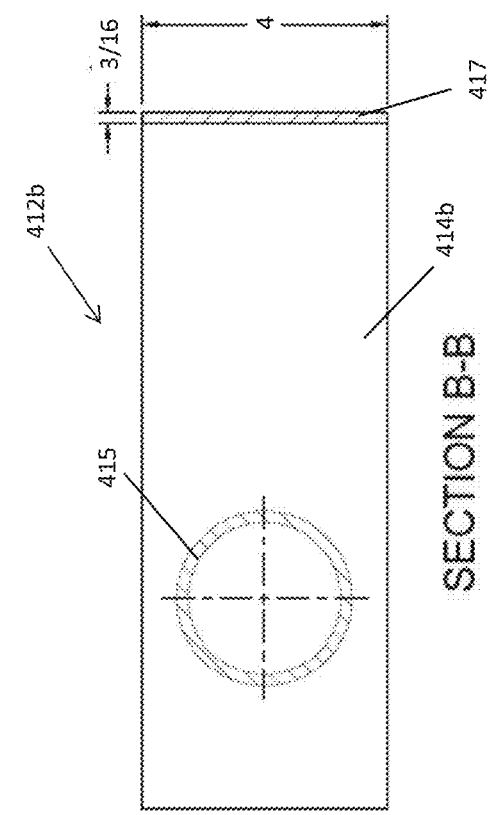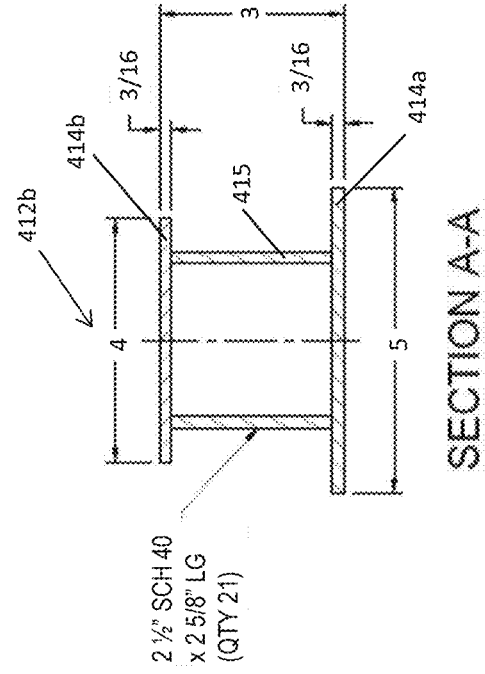

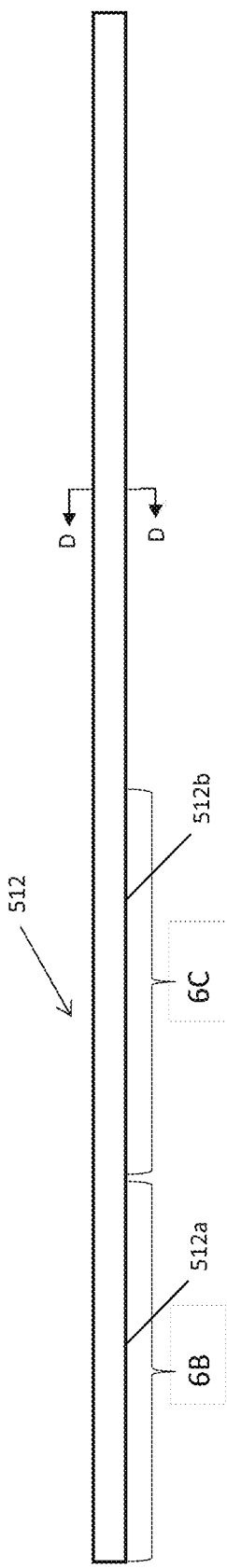
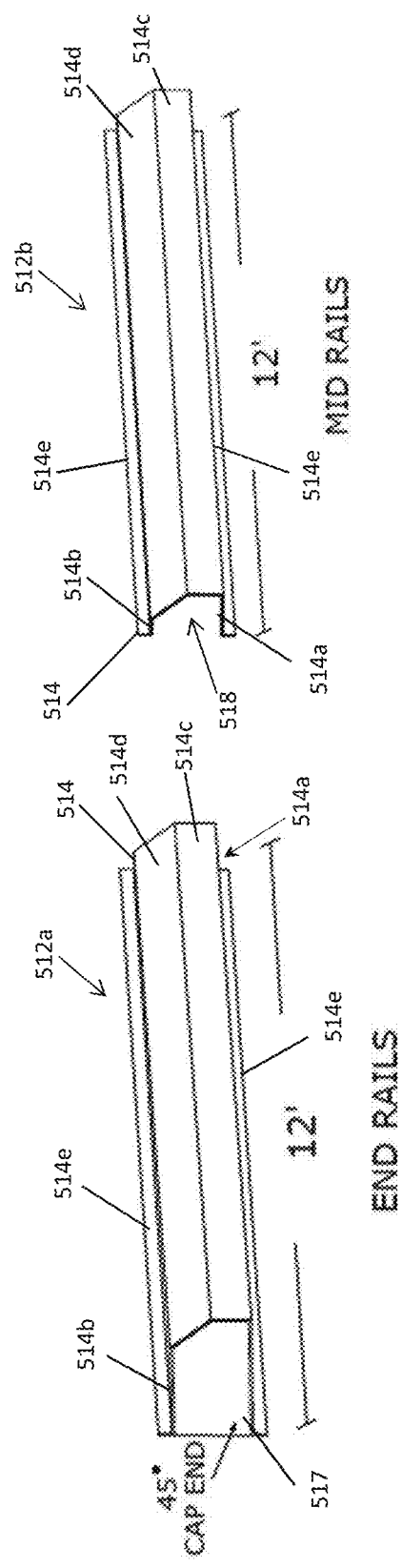
FIG. 6A
FIG. 6B
FIG. 6C

CONVERSION SYSTEMS FOR CUSTOMIZING STANDARD TRAILERS FOR SPECIALIZED USES

CROSS-REFERENCE TO RELATED APPLICATIONS

This application claims priority to U.S. Provisional Application Nos. 63/531,731 filed on Aug. 9, 2023 and 63/563,497 filed Mar. 11, 2024, the entire disclosures of which are incorporated herein by reference.

FIELD OF INVENTION

The present invention is related to trailers, also known as semitrailers, and truck equipment and more particularly, to conversion systems for customizing standard trailers and other trailers for specialized uses.

BACKGROUND OF THE INVENTION

Trailers or semitrailers are configured to attach to a tractor unit and for carrying freight. Different types of trailers are used for different purposes. For example, dry van trailers have a fully enclosed configuration and are used for transporting a variety of dry products. Reefer trailers or refrigerated trailers also have a fully enclosed configuration and are designed to keep products at a specific temperature or temperature range and are typically used to keep freight cold.

Dimensions of trailers are regulated by the Federal Surface Transportation Assistance Act (STAA) as well as by state trucking permit regulations, which establish a maximum external width of 8 feet 6 inches, or 102 inches, for trailers. To comply with the regulations and to maximize capacity of the trailers, standard trailers in the United States have an external width of 102 inches and varying length and heights, depending on the type of trailer. This trailer width, as well as the other trailer dimensions, are also dictated by the dimensions of the pallets on which the goods are shipped, with the most common pallets being 40 inches by 48 inches. A standard 102-inch-wide trailer can typically hold two rows of pallets, which may be loaded into the trailer using a forklift or similar freight loading equipment.

Special refrigerated trailers or reefers are used for transportation of dairy and other beverages due to the dimensions of standard beverage crates. These special refrigerated trailers, also called dairy trailers, have an external width of 96 inches and an internal width of 92 inches and must be specially ordered by transportation and logistics companies. Since the dimensions of dairy trailers are smaller than those of the standard 102-inch-wide trailers, dairy trailers would only be able to accommodate a single row of standard pallets and thus, are not used by the logistics and transportation industry for any other purposes other than to transport dairy and other beverages. This limits the usefulness of dairy trailers and increases the cost of transporting dairy and other beverages from distribution plants to local destinations.

SUMMARY OF THE INVENTION

The terms trailer and semitrailer are interchangeably used in this application to refer to trailers for hauling freight and attachable to a tractor unit or the like.

The present invention provides a conversion system that allows standard 102-inch-wide semitrailers to be converted for shipping dairy and other beverages in standard beverage crates. Moreover, the conversion system of the present invention can be used to customize other types of semitrailers to specific dimensions for easy loading of freight and for safe transport of freight that minimizes shifting and damage during transport. The conversion system of the present invention also promotes airflow around the freight/cargo and maintains constant temperature within the trailer, particularly in refrigerated trailers.

In accordance with the invention, the conversion system for modifying internal dimensions of a semitrailer comprises a plurality of first bumpers, each of which is configured to removably attach to one of first and second opposing sidewalls of the semitrailer. The plurality of first bumpers are configured to reduce an internal usable width of the semitrailer, and are also configured to allow airflow around the freight within the semitrailer. In certain embodiments, the plurality of first bumpers are further configured to guide freight loading equipment into the semitrailer.

In some embodiments, the plurality of first bumpers are formed from metallic materials or polymer materials. For example, the plurality of first bumpers may be formed from aluminum and/or ridged plastic.

In certain embodiments, each of the first bumpers comprises first and second elongated bars separated by a plurality of posts coupled to each of the first and second elongated bars, and each of the first bumpers includes at least one angled end. In some embodiments, each of the first bumpers includes a gusset plate coupled to ends of the first elongated bar and the second elongated bar, with the gusset plate forming the angled end of the first bumper. The gusset plate may extend at a 20-60 degree angle relative to the first elongated bar.

In some configurations of the first bumpers, the first elongated bar has a greater width than the second elongated bar and the first elongated bar is configured to removably attach to one of the first and second opposing sidewalls of the semitrailer. Moreover, in some embodiments, each of the first bumpers has a predetermined depth between 3 and 5 inches and is configured to reduce the internal usable width of the semitrailer by the predetermined depth.

In certain embodiments, the conversion system further comprises second bumpers having a different configuration from the first bumpers. The second bumpers are configured to guide freight loading equipment into the semitrailer and the second bumpers are configured to prevent freight from resting on top of the second bumpers. In some embodiments, each of the second bumpers comprises a hat rail having a beveled upper corner, and may include a plurality of gusset members provided within a channel of the hat rail at predetermined intervals. In some embodiments, each of the second bumpers includes at least one angled end.

In certain embodiments, the conversion system further comprises a movable bulkhead configured to partition internal usable length of the semitrailer, wherein the movable bulkhead is configured to removably attach to one or more of (1) the plurality of first bumpers and (2) the first and second opposing sidewalls of the semitrailer. In some embodiments, the movable bulkhead comprises a panel, a plurality of hinges extending from one side of the panel and at least one lock fastener extending from an opposing side of the panel.

In accordance with the invention, a semitrailer for hauling freight configured to attach to a tractor unit is also described. The semitrailer comprises an enclosed compartment and an axle assembly, the enclosed compartment including at least first and second opposing sidewalls extending from a floor, and a conversion system for modifying internal dimensions of the enclosed compartment. The conversion system includes a plurality of first bumpers, each of the first bumpers being configured to removably attach to one of the first and second opposing sidewalls of the enclosed compartment. When the plurality of bumpers are attached to the first and second opposing sidewalls of the enclosed compartment, the plurality of first bumpers reduce an internal usable width of the enclosed compartment, and the plurality of first bumpers allow airflow around the freight within the enclosed compartment. The plurality of first bumpers may be formed from metallic materials and/or polymer materials. The first bumpers may have the configuration described above.

In some embodiments of the semitrailer, the plurality of first bumpers include a first pair of first bumpers configured to removably attach to the first and second opposing sidewalls of the enclosed compartment at a first predetermined height from the floor, and a second pair of first bumpers configured to removably attach to the first and second opposing sidewalls of the enclosed compartment at a second predetermined height from the floor greater than the first predetermined height. In some embodiments, the plurality of first bumpers may further include a third pair of first bumpers configured to removably attach to the first and second opposing sidewalls of the enclosed compartment at a third predetermined height from the floor smaller than the first predetermined height.

In certain embodiments, the conversion system further comprises a pair of second bumpers having a different configuration from the first bumpers and configured to removably attach to the first and second opposing sidewalls of the enclosed compartment at a third predetermined height from the floor smaller than the first predetermined height. The second bumpers may have the configuration described above.

In some embodiments, the semitrailer further comprises a movable bulkhead configured to partition internal usable length of the trailer, wherein the movable bulkhead is configured to removably attach to one or more of the plurality of first bumpers and the first and second opposing sidewalls of the semitrailer.

In accordance with the invention, a conversion system is described for modifying internal dimensions of a semitrailer for hauling freight comprising a movable bulkhead configured to partition internal usable length of the semitrailer. The movable bulkhead comprises a panel configured to removably connect to the semitrailer at predetermined locations along a length of the semitrailer for adjustably partitioning the internal usable length of the semitrailer. In some embodiments, the movable bulkhead further comprises a plurality of hinges extending from one side of the panel for hingedly connecting the panel to a sidewall of the semitrailer and at least one lock fastener extending from an opposing side of the panel for locking the panel relative to an opposing sidewall of the semitrailer. The movable bulkhead may be formed from one of metallic materials and polymer materials, and in some embodiments, the panel comprises bar grating and a solid frame around the bar grating.

BRIEF DESCRIPTION OF DRAWINGS

The above and other features and aspects of the present invention will become more apparent upon reading the following detailed description in conjunction with the accompanying drawings, in which:

FIGS. 4A-4B show a third embodiment of a conversion system installed in a trailer;

FIGS. 5A-5I show detailed views of elongated bumpers included in the conversion systems of FIGS. 1-4B;

FIGS. 6A-6E show detailed views of lower bumpers of a conversion system of FIGS. 4A-4B;

DETAILED DESCRIPTION OF THE INVENTION

Figure 1:
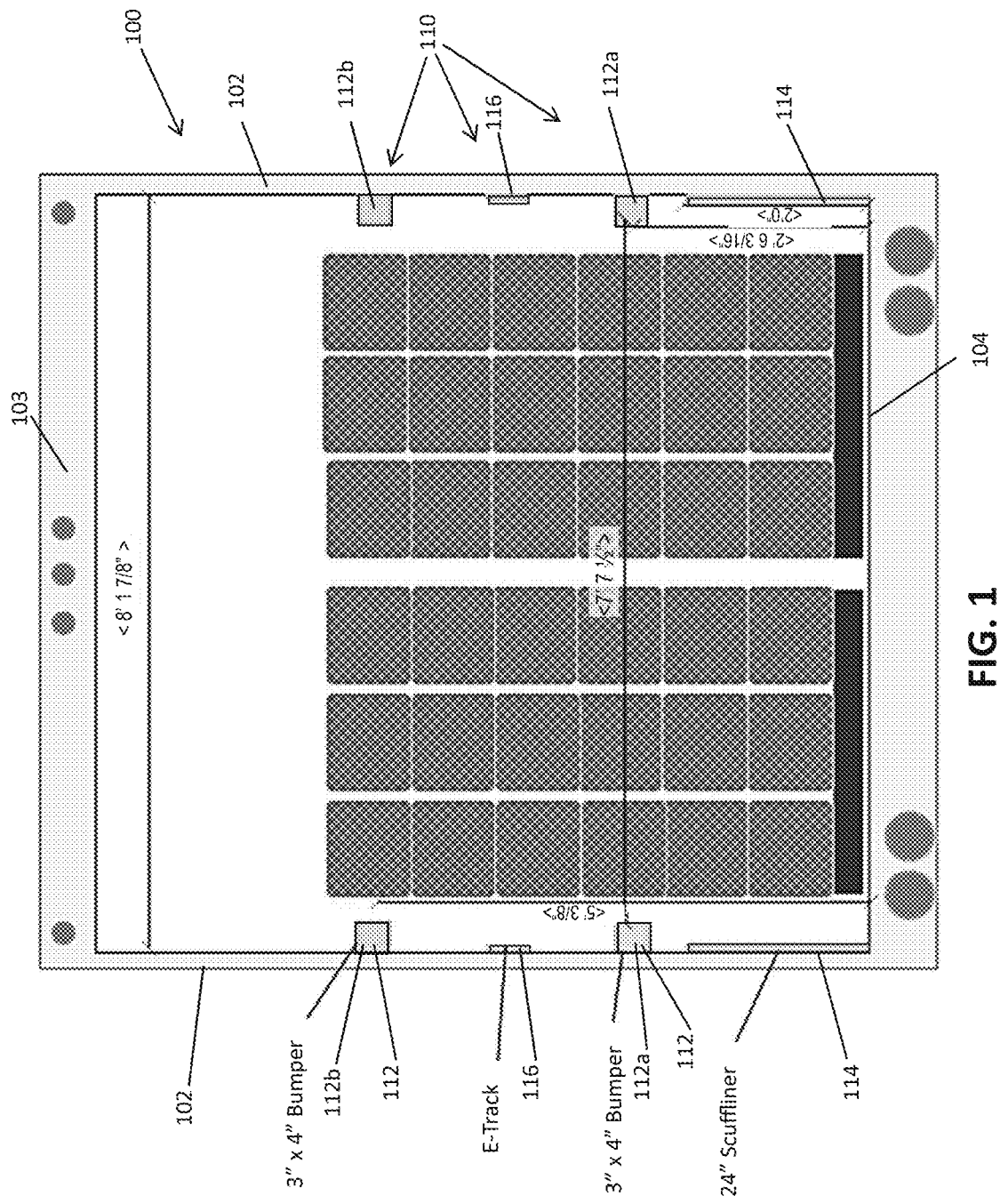
FIG. 1 shows a rear view of a trailer with a first embodiment of a conversion system of the present invention installed in the trailer.
Figure 2:
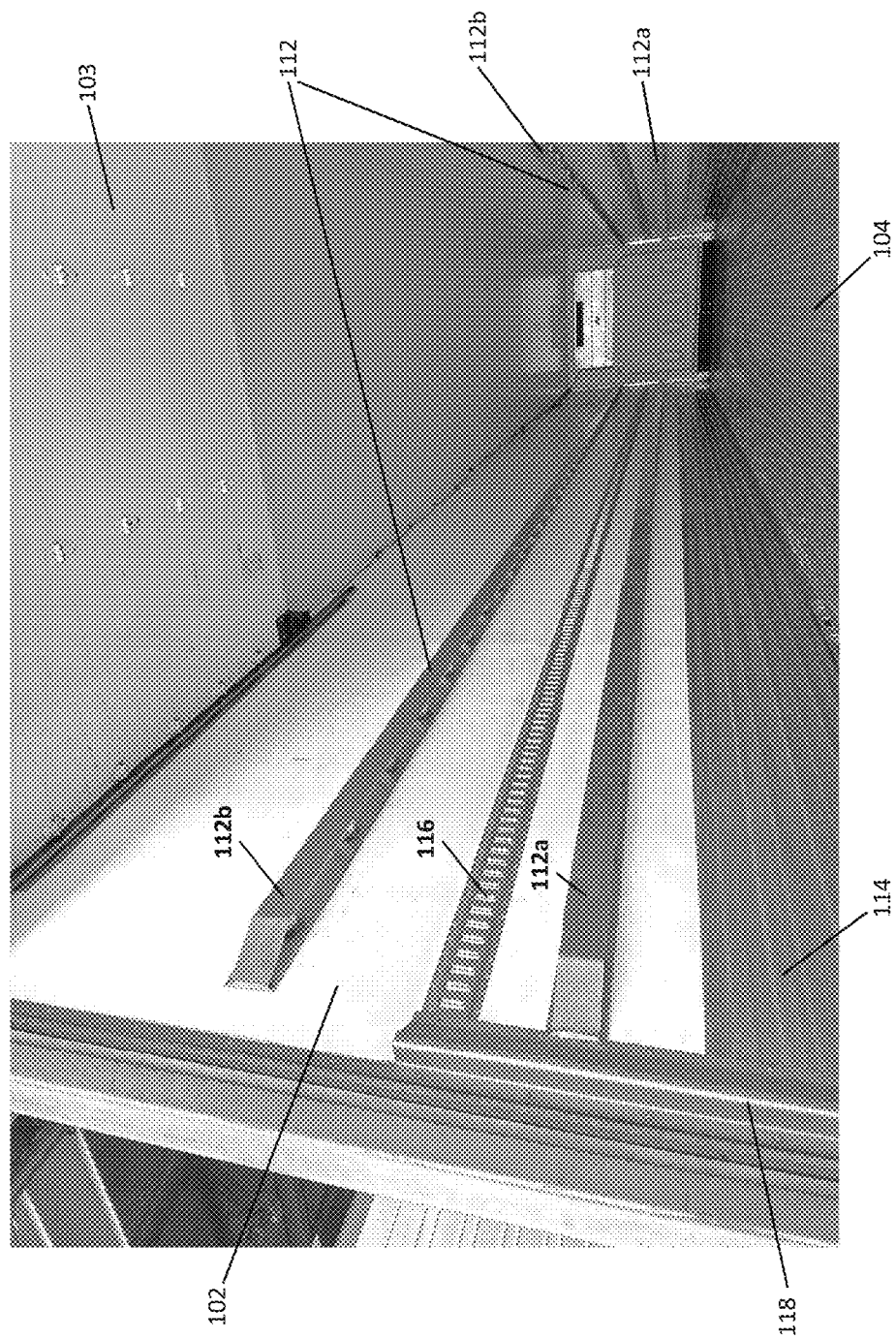
FIG. 2 shows a photograph of an inside of the trailer of FIG. 1.

FIG. 1 shows a rear view of a trailer 100 with a first embodiment of a conversion system 110 of the present invention installed in the trailer, and FIG. 2 shows a photograph of the conversion system of FIG. 1 inside the trailer. In the illustrative embodiment described below, the trailer is a standard refrigerated trailer, also referred to as a reefer trailer, with a standard external width of 102 inches and an internal width of 97⅞ inches. An illustrative length of the trailer in this embodiment is 48 to 53 inches and an illustrative height of the trailer is around 162 inches, including the wheels, with an internal height being around 103 inches. It is understood that the external and internal dimensions of the trailer may be varied and that the conversion system of the present invention may be used with or modified in dimensions for use with smaller or larger trailers. In addition, the conversion system of the present invention may be used with either standard trailers, whether refrigerated or not refrigerated, and with non-standard, special-ordered trailers.

As shown in FIGS. 1-2, the trailer 100 includes first and second sidewalls 102, a top wall 103 and a floor 104 formed by a bottom wall, and the conversion system 110 of the first embodiment includes at least one bumper 112 attached to, or mounted on, each sidewall 102 of the trailer so as to protrude inwardly from an inner surface of the sidewall 102. In certain embodiments, the bumpers 112 attach to internal posts of a standard refrigerated trailer or directly to the sidewall surface of the trailer.

In the embodiments of FIGS. 1-2, when the bumpers 112 are installed on the sidewalls 102 of the trailer, internal working dimensions of the trailer suitable for loading freight, and specifically, internal working width of the trailer, are reduced. In the illustrative embodiment, when the bumpers 112 are used with the standard 102-inch refrigerated trailer, the internal working width of the trailer is reduced to 92 inches so as to allow the trailer to be used to safely transport milk crates or beverage crates. However, it is understood that the changes in the reduced working internal dimensions of the trailer may vary depending on the original internal working dimensions of the trailer and the dimensions of the bumpers 112, e.g., depth of the bumpers 112, installed in the trailer.

As shown in FIGS. 1-2, the bumpers 112 are attached to the sidewalls at predetermined distances (heights) from the floor 104 so as to provide sufficient support for the freight to be transported. In the illustrative embodiment of FIG. 1, a first set of bumpers 112a (first pair of bumpers 112a) is attached to the sidewalls 102 at a first predetermined distance (height) from the floor 104, which is between ¼ and ⅓ of the internal height of the trailer. In the example shown in FIG. 1, the first predetermined distance (height) is around 30-35 inches, and one example, 30 3/16 inches from the floor. The first predetermined distance (height) may be varied depending on the internal height of the trailer and the freight to be transported. In addition, in the embodiment of FIG. 1, a second set of bumpers 112b (second pair of bumpers 112b) is attached to the sidewalls 102 at a second predetermined distance (height) from the floor 104, which is greater than the first predetermined distance (height). In the present embodiment, the second predetermined distance (height) from the floor 104 is at about ½ to ⅔ of the internal height of the trailer. In the example of FIG. 1, the second predetermined distance (height) is around 60-65 inches, and more specifically 60 ⅜ inches.

Figure 3:
FIG. 3 shows a second embodiment of a conversion system installed in a trailer.

Although the embodiment of FIG. 1 uses two sets of bumpers, in other embodiments, additional sets of bumpers may be provided in the conversion system. For example, in the embodiment shown in FIG. 3, the conversion system includes a third set of bumpers (third pair of bumpers), or lower bumpers, attached at a third predetermined distance (height) from the floor which is smaller than the first predetermined distance (height). In FIG. 3, the lower bumpers are attached below ¼ of the internal height of the trailer, at a height of about 3-12 inches from the floor. In other illustrative embodiments, the conversion system may include a further set of bumpers attached closer to the top wall of the trailer, at a distance greater than the second predetermined distance (height) from the floor.

The bumpers 112 of the conversion system 110 are formed from metallic materials, such as aluminum, steel, stainless steel, copper, titanium, or other suitable metals, or from plastic or polymer materials, such as ridged plastic. In certain embodiments, the bumpers 112 are formed from lightweight, rigid materials to provide a structurally sound framework and to allow for easy removal and installation of the bumpers on the interior sidewalls of the trailer.

As mentioned above, when the bumpers are installed on the internal sidewalls of the trailer, the internal working dimensions of the trailer are reduced so as to allow the trailer to be used with standard milk or beverage crates. In other embodiments, the bumpers may be used to reduce the internal working dimensions of the trailer to allow the trailer to be used with a variety of sizes of pallets or crates. The addition of these bumpers 112 enables standard trailers and other larger size trailers to haul pallets of milk or beverage crates without the load toppling over. The bumpers 112 also allow for reducing the internal dimensions of any trailer to allow for hauling of smaller size products without worrying about the products shifting during transit. In addition, due to the construction of the bumpers 112 described in more detail below with respect to FIGS. 5A-I and 6A-E, airflow over and around the freight, such as milk or beverage crates, is increased so that constant temperature is maintained in the freight being hauled.

In order to allow for the above-described versatile use of trailers, the bumpers 112 are configured to be removable from the trailers. That is, the bumpers 112 are not permanently or non-removably attached to the sidewalls of the trailer. Instead, the bumpers 112 are attached to the trailer sidewalls using fasteners, such as screws, or other removable or releasable mounting mechanisms, so that the bumpers 112 can be removed to allow for hauling of larger loads and installed for hauling of smaller loads. In certain embodiments, the bumpers 112 may be interchangeable with other bumpers having different dimensions so as to adjust the internal working dimensions of the trailer to the size of the freight to be transported.

In certain embodiments, the conversion system 110 includes additional components, such as one or more e-track rails and one or more scuff liners. In the embodiment of FIGS. 1 and 2, the conversion system 110 includes a 24" scuff liner 114 attached to each sidewall adjacent to and above the floor 104 and an e-track rail 116 attached to each sidewall at a height between the first predetermined distance (height) and the second predetermined distance (height) from the floor and between the bumpers of the first and second sets of bumpers 112a, 112b. The e-track rail 116 can be used for securing loads within the trailer, and the scuff liners 114 protect the bottom of the trailer from pallet and forklift damage. As shown in FIG. 1, the scuff liners 114 and the e-track rails 116 are formed from metallic materials, such as aluminum or other metals. In certain embodiments, the scuff liners 114 and the e-track rails 116 may be formed from plastic or polymer materials having sufficient strength to withstand repeated application of force.

As shown in FIG. 2, the bumpers 112, the e-track rails 116 and the scuff liners 114 extend along at least a majority of the trailer length and in FIG. 2, along most of the length of the trailer. The bumpers 112 and the e-track rails 116 may be positioned at a certain distance away from the entrance/doorway into the trailer so as not to interfere with the entrance into the trailer. In addition, as can be seen in FIG. 2, a vertical rail or hat channel 118 is provided adjacent to the doorway into the trailer. The vertical hat channel 118 extends from the floor to the height of the e-track rail 116 in the illustrative embodiment of FIG. 2 and is used to protect the ends of bumper and the e-track rail from damage by a forklift or other freight loading equipment.

FIG. 3 shows a second embodiment of the conversion system 210 in accordance with the present embodiment. In this embodiment, the conversion system 210 includes the first set of bumpers 212a attached to the trailer sidewalls at the first predetermined distance (height) from the floor 104 and the second set of bumpers 212b attached to the trailer at the second predetermined distance (height) from the floor 104. The first and second sets of bumpers 212a, 212b have a similar configuration to the first and second sets of bumpers 112a, 112b of the first embodiment of FIG. 2. The detailed configuration of the bumpers 112, 212 is described in more detail herein below with reference to FIGS. 5A-5I.

The conversion system 210 of FIG. 3 also includes e-track rails 216a attached to the sidewalls at a height between the first and second predetermined distances from the floor 104 of the trailer, and scuff liners 214 attached to the sidewalls just above the floor 104. The conversion system 210 of FIG. 3 includes additional e-track rails 216b attached to the sidewalls above the scuff liner 214 and below the first set of bumpers 212a and further e-track rails 216c attached to the sidewalls below and adjacent to the second set of bumpers 212b. These e-track rails 216b, 216c allow for additional securing of the freight inside the trailer.

As shown in FIG. 3, the conversion system 210 also includes a third set of bumpers 212c (third pair of bumpers 212c), or lower bumpers 212c, provided at a third predetermined distance (height) above the floor which is smaller than the first predetermined distance. As mentioned herein above, the lower bumpers 212c are attached below ¼ of the internal height of the trailer, and the third predetermined distance (height) is about 3-12 inches from the floor 104. In the embodiment of FIG. 3, the configuration of the third set of bumpers 212c is similar to the configuration of the other bumpers 212a, 212b and is described in more detail below with respect to FIGS. 5A-5I.

As in the first embodiment, in the second embodiment of FIG. 3, the bumpers 212, the e-track rails 216a-c and the scuff liners 214 extend along most of the length of the trailer, and the bumpers 212 and the e-track rails 216 may be positioned at a certain distance away from the entrance/doorway into the trailer so as not to interfere with the entrance into the trailer. Also as in the first embodiment, a vertical rail or hat channel 218 is provided adjacent to the doorway into the trailer on each sidewall, and extends from the floor to the height of the e-track rail 216a in the illustrative embodiment of FIG. 3.

The second embodiment of FIG. 3 may be modified so that the configuration of the lower bumpers is different from the configuration of the lower bumpers 212c in FIG. 3 and from the first and second sets of bumpers 212a, 212b. This third embodiment is shown in FIGS. 4A and 4B. In the third embodiment, the conversion system 310 includes the first and second sets of bumpers 312a, 312b having a configuration similar to those of the first and second sets of bumpers 112a, 212a, 112b, 212b in the first and second embodiments. The conversion system also includes lower bumpers 312c having a different configuration from the first and second sets of bumpers 312a, 312b and comprising a hat channel rail having a predetermined cross-sectional profile so that the lower bumpers 312c can guide fork trucks into the trailer and deflect pallets from sitting or resting on top of the lower bumpers 312c. As can be seen from FIGS. 4A-4B, the lower bumpers 312c have an enclosed configuration, rather than the open configuration of the lower bumpers 212c of the second embodiment and have at least part of their upper surface angled downwardly, i.e., beveled, which prevents pallets/freight from sitting or resting on top of the lower bumpers 312c. An exemplary configuration of lower bumpers for use in the third embodiment are shown in FIGS. 6A-6E and described below in more detail.

The above-described embodiments may be further modified to include bumpers on other portions of the trailer. For example, the conversion systems described above may be modified to further include one or more roof bumpers configured to removably attach to the roof 103 of the trailer. Such one or more roof bumpers may be configured to extend across the width of the roof 103 of the trailer between two sidewalls 102 or may be configured to extend lengthwise between a front wall/bulkhead of the trailer and the doorway. The roof bumpers may be used in the trailer for smaller loads that require additional stabilization or for attaching securing mechanisms for the loads to the roof. The configuration of the roof bumpers may be similar to the configuration of the first and second sets of bumpers. In certain embodiments, the conversion systems described above may include retractable or collapsible bumpers attached to the sidewalls 102 and/or the roof. For example, such bumpers may be provided in similar locations as described above and may be removable as described above, or may be permanently attached and may be movable from a first orientation in which the bumpers are retracted into or against the wall's surface, e.g., a collapsed or retracted configuration, to a second orientation in which the bumpers project from the wall's surface, e.g., an extended configuration. In some embodiments, the bumpers extend inwardly from the inner wall surfaces in the extended configuration, and are pivoted up or down toward the wall so as to extend adjacent to the inner wall surface in the retracted configuration.

In certain embodiments, the conversion systems described above may include an adjustable bulkhead or adjustable front wall configured to adjust or partition the inner usable length dimension of the trailer. The adjustable bulkhead may be movable along the length of the trailer to change the inner length dimension of the trailer as needed or to partition the space within the trailer. The adjustable bulkhead may be used for retaining freight closer to the back of the trailer either due to the size of the freight and/or due to the weight of the freight in order to balance the trailer and to efficiently haul the freight. The adjustable bulkhead used with a trailer is described in more detail below with reference to FIGS. 7 and 8.

As mentioned above, FIGS. 5A-5I show an illustrative configuration of the bumpers used in the first and second sets of bumpers 112a, 112b, 212a, 212b and in some embodiments, the configuration of the lower bumpers 212c. FIGS. 5A-5E show an entry-side portion 412a of the bumper 412 that extends from the doorway/entry side of the trailer (i.e., rear of the trailer) when attached to the trailer sidewall. FIGS. 5F-5I show a bulkhead-side portion 412b of the bumper 412 that extends from the entry-side portion 412a of the bumper 412 toward the front wall or bulkhead of the trailer. The illustrative dimensions shown in FIGS. 5A-5I are for bumpers 412 configured to be used with 53-foot-long, 102-inch-wide trailers. In the illustrative embodiment of FIGS. 5A-5I, the entry-side portion 412a has a length of 24 feet and the bulkhead-side portion 412b of the bumper has a length of 28 feet so that the bumper 412 has a total length of 52 feet. It is understood that the dimensions of the bumper 412 may be varied depending on the dimensions of the trailer.

Figure 5E:
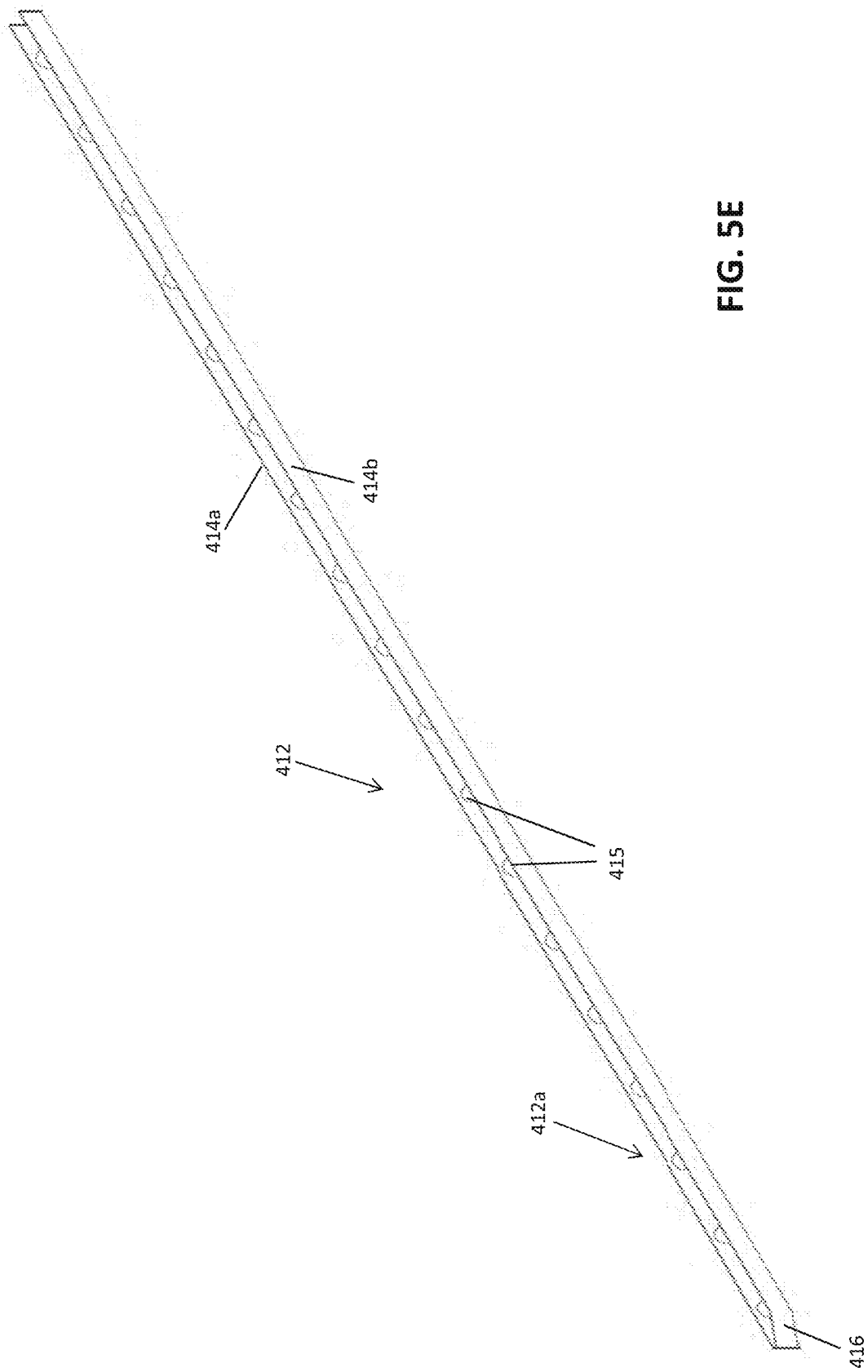

FIG. 5A shows a top and side views of the entry-side portion 412a of the bumper 412 while FIG. 5E shows a perspective view thereof. FIG. 5B shows a cross-sectional view of the bumper 412 taken along line A-A in FIG. 5A. FIG. 5C shows an enlarged view of the entry-side end portion of the bumper 412 within a circled area B in FIG. 5A, and FIG. 5D shows a cross-sectional view taken along line C-C in FIG. 5A.

As shown in FIGS. 5A, 5E, 5F and 5I each bumper 412 comprises two elongated bars 414, including a first bar 414a configured to abut and attach to the trailer wall when installed, and a second bar 414b configured to face the inside of the trailer and spaced from the first bar 414a by a predetermined spacing. The first and second bars 414 may have the same width and thickness or may have different widths and/or thicknesses. In the illustrative embodiment of FIGS. 5A-5I, each of the bars 414 comprises a flat stock piece of aluminum and has a thickness of $\frac{3}{16}$ inch, and the first bar 414a has a greater width than the second bar 414b. For example, the first bar 414a has a width of about 5 inches, while the second bar 414b has a width of about 4 inches. In this illustrative example, the predetermined spacing between the bars 414a, 414b is about $2\frac{5}{8}$ inches with a total depth of the bumper 412 being 3 inches. However, the predetermined spacing may be varied depending on the internal dimensions of the trailer and the desired reduction in the internal dimensions of the trailer. In some embodiments, the predetermined spacing is selected such that the total depth of the bumper 412 is between 3 and 5 inches, depending on the needs of the freight width. However, it is understood that the total depth of the bumper may also be increased or decreased, if needed, so as to accommodate the desired freight width.

Figure 5I:
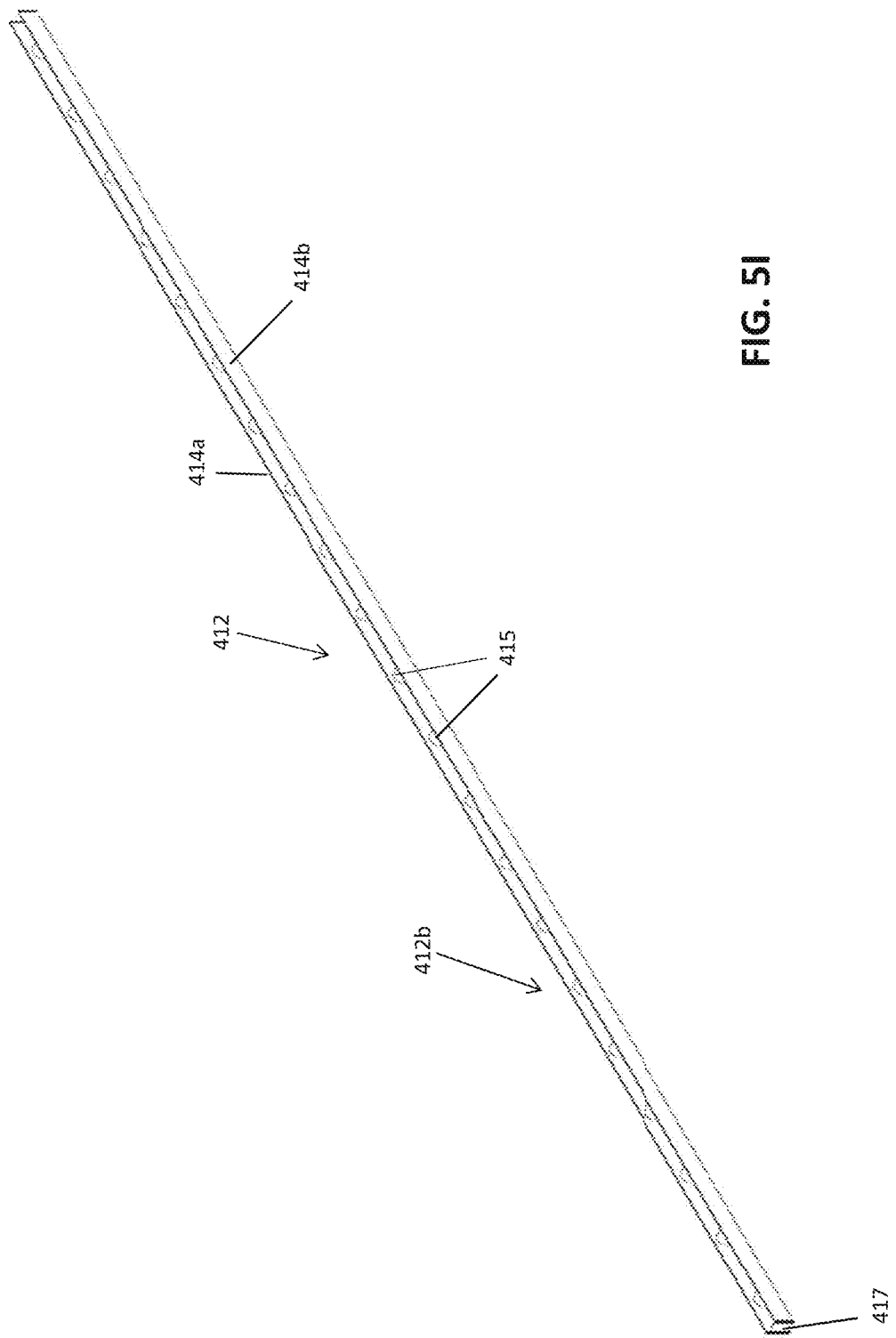

As shown in FIGS. 5A, 5E, 5F and 5I, the first and second bars 414a, 414b are separated by a plurality of posts 415 disposed between the two bars 414a, 414b along the length of the bumper 412 at predetermined intervals. In the illustrative embodiment, the posts 415 are positioned every 16 inches along the length of the bumper 412 between the two bars 414a, 414b to form a supporting structure while allowing for airflow through and around the bumpers. The intervals between adjacent posts 415 may be varied and may be regular, substantially equal intervals or may be irregular intervals. As can be seen in FIGS. 5E, 5H and 5I, the posts 415 in this illustrative embodiment have a hollow cylindrical shape with a circular cross-section, but in other embodiments, the specific shape of the posts 415 may be different so long as they provide sufficient structural support to the bumpers and are sufficiently lightweight. In the present illustrative example, the posts 415 are formed from 2.5" schedule 40 aluminum cylindrical pipe, and the end of each post 415 is attached the respective bar 414a, 414b by welding or similar technique. In other embodiments, square or rectangular shaped tubing made from metallic or polymer materials may be used for the posts 415. To maximize airflow around the trailer and around the freight, the thickness or diameter of the posts in this embodiment is smaller than the widths of the bars 414a, 414b. However, the dimensions of the posts, including post thickness or diameter, may be varied, depending on the availability of materials and/or desired strength requirements of the bumpers.

As shown in FIGS. 5A, 5C and 5E, a leading end of the entry-side bumper portion 412a is angled to allow for easier loading of the pallets and crates into the trailer. As can be seen in FIG. 5C, a gusset plate 416 is provided to connect the ends of the first and second bars 414a, 414b and to form the angled leading end. In the illustrative embodiment shown, the gusset plate 416 extends at an acute angle relative to the first bar 412a, which can be between 20 and 80 degrees, or between 20 and 70 degrees, or between 20 and 60 degrees, or between 20 and 50 degrees, or between 25 and 45 degrees, or between 20 and 40 degrees. In the illustrative example shown, the acute angle between the first bar 414 and the gusset plate 416 is 30 degrees. The thickness of the gusset plate 416 in this illustrative embodiment is substantially the same as the thickness of the second bar 414b, which can be, for example, around 3/16 inch. The angled gusset plate 416 at the leading ends of the bumpers is visible in FIGS. 2, 3 and 4B.

In some embodiments, the leading end of the bumper portion 412a may further include one or more supporting beams or plates provided between the gusset plate 416 and the first bar 414a. The one or more supporting beams or plates provide additional support to the angled leading end of the bumper portion 412a to prevent bending of the gusset plate 416 if the leading end of the bumper 412 is bumped during loading of freight.

As shown in FIGS. 5F, 5H and 5I, the opposing end of the bumper 412 provided on the bulkhead-side portion 412b is capped with an end cap 417. The end cap 417 connects between the two ends of the first and second bars 414a, 414b to close off the opposing end of the bumper 412. The end cap 417 may be formed from the same materials as the first and second bars 414a, 414b and may have similar thickness to the first and second bars 414a, 414b. The end cap 417 may be attached to the first and second bars 414a, 414b using welding or other suitable techniques.

Although the bumpers 412 in this illustrative example are formed from aluminum, it is understood that other metallic materials, or a mix of different metallic materials, maybe used for forming the bumpers or for forming certain components thereof. In addition, as mentioned above, the bumpers may be formed from ridged plastic or suitable polymer materials, or from a combination of metallic and plastic/polymer materials. When the bumpers are formed from plastic or polymer materials, injection molding or 3D printing may be used for the above-described components of the bumpers or for the whole bumper.

The bumpers described above and shown in FIGS. 5A-5I can be attached to the sidewalls of the trailer using screw fasteners, such as 2-inch screws, or any other suitable fasteners or attachment means. In some embodiments, the sidewalls of the trailer may include fastening portions for removable attachment of the bumpers in predetermined areas. For example, one or more guiding channels may be provided for attachment of each bumper, and the bumper is removably attached to the building channels by sliding the first bar of the bumper into one or more guiding channels. In such embodiments, the bumpers, when attached to the fastening portions, may also be locked in place using a suitable locking mechanism or one or more fasteners, such as screws.

An example of manufacturing the bumpers 412 of FIGS. 5A-5I is described in Example 1 below.

Example 1

Components required for manufacturing the bumpers include:
1. 2 flat stocks pieces of aluminum, both 52 ft long. 1 is 5" wide and the other is 4" wide;
2. 2.5" schedule 40 aluminum placed every 16" on center between both pieces of flat stock;
3. 1 gusset 3/16" thick at beginning of bumper; and
4. 80 2" stainless screws.

To form the bumpers 412 described above, Items 1 and 2 are laid out where the 5" piece of stock (first bar 412a) is on bottom. The schedule 40 (posts 415) is then placed every 16" on top of the bottom stock (first bar 412a). Schedule 40 (posts 415) is then welded to bottom stock (first bar 412a). The top 4" piece of flat stock (second bar 412b) is then laid on top of schedule 40 (posts 415) and is also welded to Schedule 40 (posts 415). On the leading edge, a 30-degree gusset (gusset plate 416) is then welded in place. Once the bumper (412) is completed it is then installed in the semi-trailer attaching to side posts using 2" screws.

In certain embodiments described above, the lower bumpers have a different configuration from the bumpers shown in FIGS. 5A-5I. In some embodiments, the lower bumpers 512 have a configuration shown in FIGS. 6A-6E, wherein each lower bumper 512 comprises a hat rail having a predetermined bend profile configured to guide forklifts and other freight loading equipment into the trailer and to promote slipping of freight down so as to prevent pallets and crates from sitting or resting on top of the lower bumpers. Each lower bumper 512 includes a capped end including an end cap 517 covering the open end of the hat rail and a plurality of gussets 516 provided at predetermined intervals along the length of the hat rail. The capped end of the lower bumper 512 is positioned at the entry side of the trailer. In some embodiments, only one end of the lower bumper 512 is capped, while in other embodiments, both ends of the lower bumper 512 are capped.

FIG. 6A shows a top view of the lower bumper 512, while FIGS. 6B and 6C show portions of the lower bumper 512 labeled as 6B and 6C, respectively, in FIG. 6A. As shown in FIG. 6A, the lower bumper 512 includes an end rail portion 512a shown in FIG. 6B forming at least one end of the bumper 512 and at least one mid rail portion shown in FIG.

6C. In one illustrative embodiment, the lower bumper 512 includes 3 mid rail portions 512b and one end rail portion 512a forming the entry-side end of the bumper 512. In the embodiment shown in FIGS. 6A-6B, each of the end and mid rail portions 512a, 512b has a length of 12 feet, with a resulting lower bumper 512 having a total length of 48 feet. In some embodiments, the lower bumper 512 includes an end rail portion 512a at each end and has one or more mid rail portions 512b provided between the end rail portions 512a. The number of the mid rail portions 512b in each lower bumper 512 may be varied depending on the desired length of the bumper and the length of the trailer. In addition, the length of each rail portion 512a, 512b may be varied depending on the length requirements of the trailer. In yet other embodiments, the lower bumper 512 may be formed from a single rail with one or both ends thereof being capped.

As shown in FIGS. 6B and 6C, each rail portion 512a, 512b is formed as an elongated hat rail 514 and includes a beveled/chamfered top outer corner. The beveled top outer corner promotes slipping of any freight placed on top of the bumper 512 so as to prevent freight from sitting on top of the bumper.

Figures 6D, 6E:
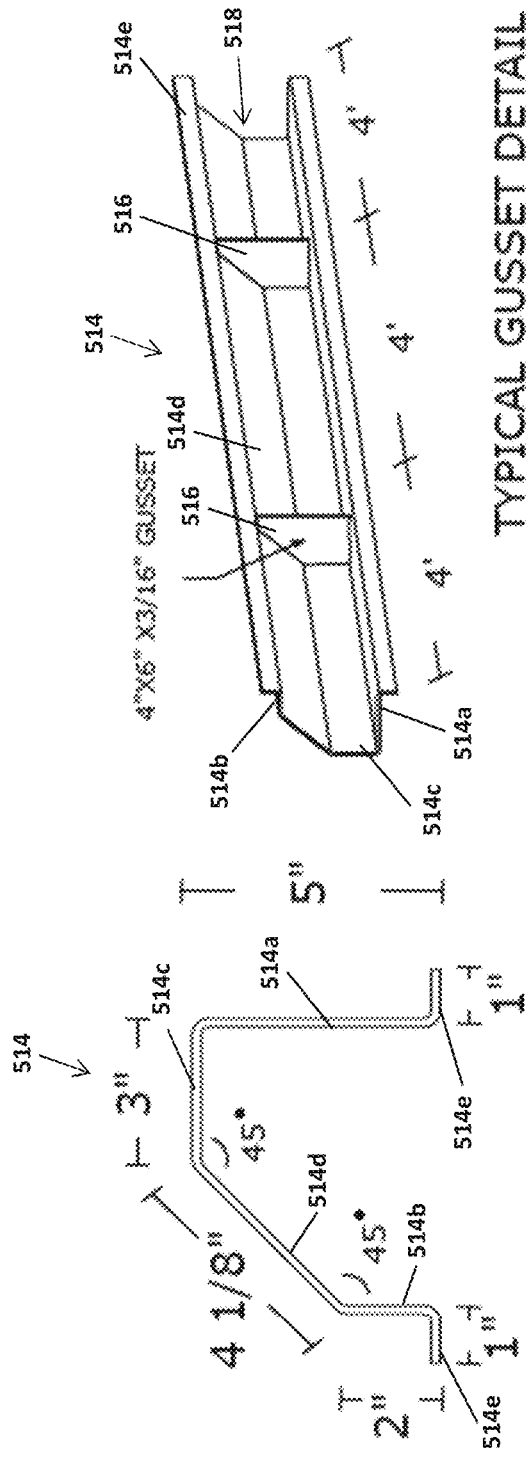

FIG. 6D shows a cross-sectional view of the bumper 512 taken along line D-D in FIG. 6A, which demonstrates a bend profile of the rail portions 512a, 512b. As shown in FIGS. 6B-6D, the hat rail 514 of each rail portion 512a, 512b includes a bottom wall 514a extending substantially horizontally when the rail portions 512a, 512b are installed in a trailer, an opposing top wall 514b substantially parallel to the bottom wall 514a and having a smaller width than the bottom wall 514a, a vertical wall 514c extending upwardly from the bottom wall 514a and an angled wall 514d extending at an angle from the top of the vertical wall 514c to the top wall 514b and forming the beveled top outer corner of the rail. As shown in FIGS. 6B-6D, the rail portions 512a, 512b also include side flanges 514e extending from the bottom and top walls 514a, 514b for connecting the rail to the wall of the trailer.

FIG. 6D shows exemplary dimensions for each of the walls 514a-e of the rail 512a, 512b that form a 5-inch deep bumper. In the illustrative example of FIG. 6D, the bottom wall 514a has a width of 5 inches, the top wall 514b has a width of 2 inches, the vertical wall 514c has a width/height of 3 inches and the angled wall 514d has a width of 4⅛ inches and is provided at a 45-degree angle relative to the planes in which the top wall 514b and the vertical wall 514c extend, with a 135-degree angle formed between these walls internally within the rail channel. As shown, the flanges 514e each extend outwardly about 1 inch. It is understood that these dimensions are illustrative and that the dimensions of the walls and the angles between them may be varied depending on the dimensions and construction of the trailer and the desired width reduction in the trailer. For example, in some embodiments, the width of the bottom wall 514a is between 3 and 5 inches so that the overall depth of the bumper 512 is between 3-5 inches. In such embodiments, the width of the top wall 514b is smaller than the width of the bottom wall 514a with the angled wall 514d connecting the vertical wall 514c and the top wall 514b so as to form the beveled top corner. The dimensions of the top wall 514b, the vertical wall 514c and the angled wall 514d are adjusted so as to form a cross-sectional profile in which the top corner is beveled with a sufficient angle relative to the top wall so as to prevent freight from sitting on top of the bumper 512.

As can be seen in FIGS. 6C and 6E, an elongated channel 518 is formed within the rails 512a, 512b. As shown in FIG. 6E, a plurality of gussets 516 are provided within the elongated channel 518 at predetermined intervals to strengthen the rails 512a, 512b and to maintain their structural integrity during loading of freight into the trailer. In the illustrative embodiment of FIG. 6E, gussets 516 formed from 4 by 6 inch metallic or polymer plates with a thickness of 3/16 inch are provided within the channel of the rails 512a, 512b at 4-foot intervals. These intervals may be modified to be between 1 and 8 feet, depending on the strength and size of the rails 512a, 512b, and in some embodiments, the gussets may be provided at irregular intervals so as to provide additional structural support in areas of heavy use.

In the embodiment of FIGS. 4A-4B, the conversion system includes the bumpers 512 of FIGS. 6A-6E as the lower bumpers 412c. Although FIGS. 6A-6E show a capped end for each for the end rails 512a, one or more of the end rails 512a of the bumper may include an angled end with an angled gusset plate attached, such as by welding or another technique, to the end of the end rail 512a. Such construction is shown in FIG. 4B, wherein at least the entry-side end rail 512a has an angled gusset plate forming the angled end, similar to the gusset plate 416 of the bumpers 412 shown in FIGS. 5A-5E. The other, bulkhead-side, the end rail 512a may have a capped end 517, as shown in FIG. 6B or may have an angled end, similar to the entry-side end rail shown in FIG. 4B, or may have an open, uncapped end.

Figure 7A:
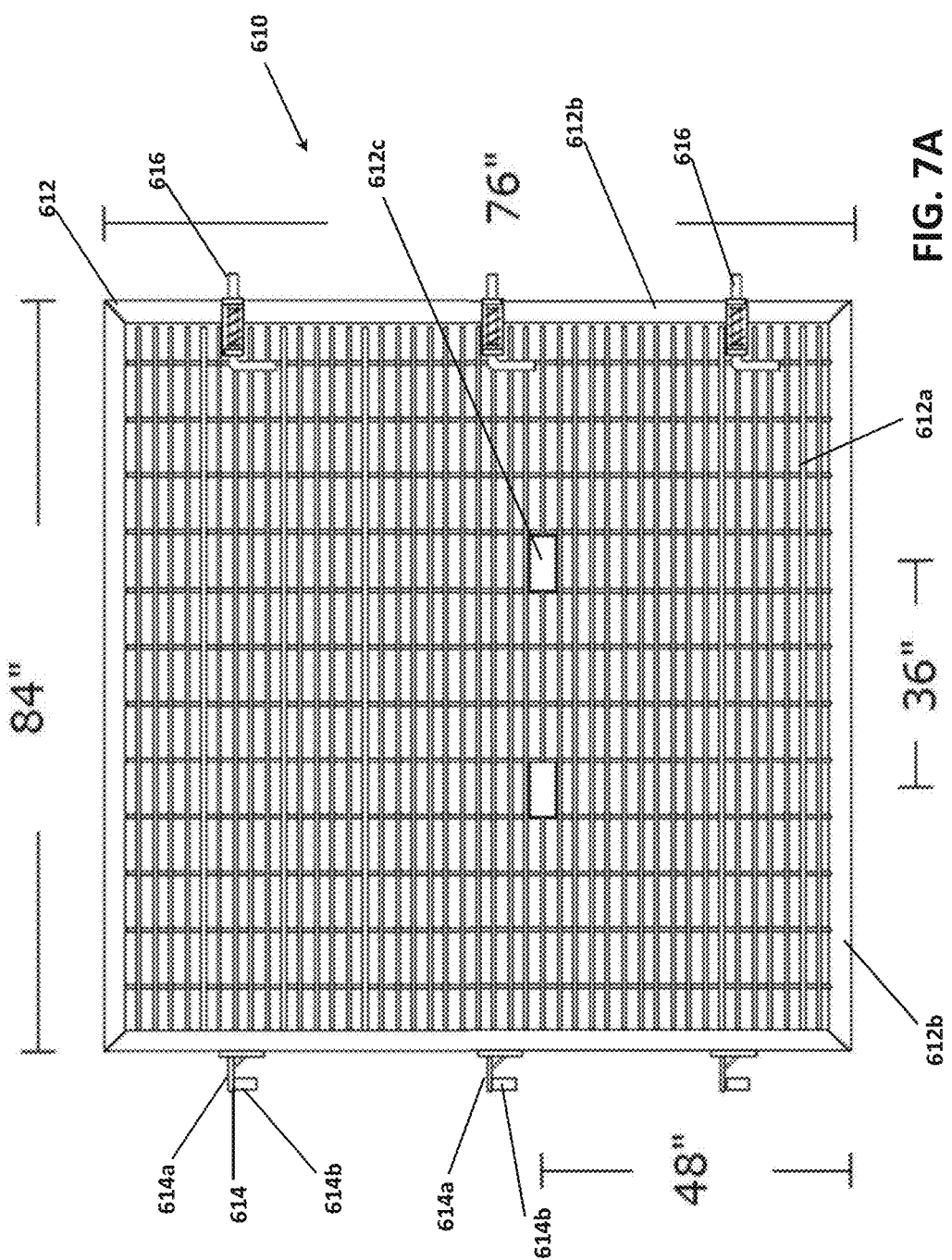
FIGS. 7A-B and 8 show a fourth embodiment of a conversion system that includes an adjustable bulkhead.
Figure 7B:
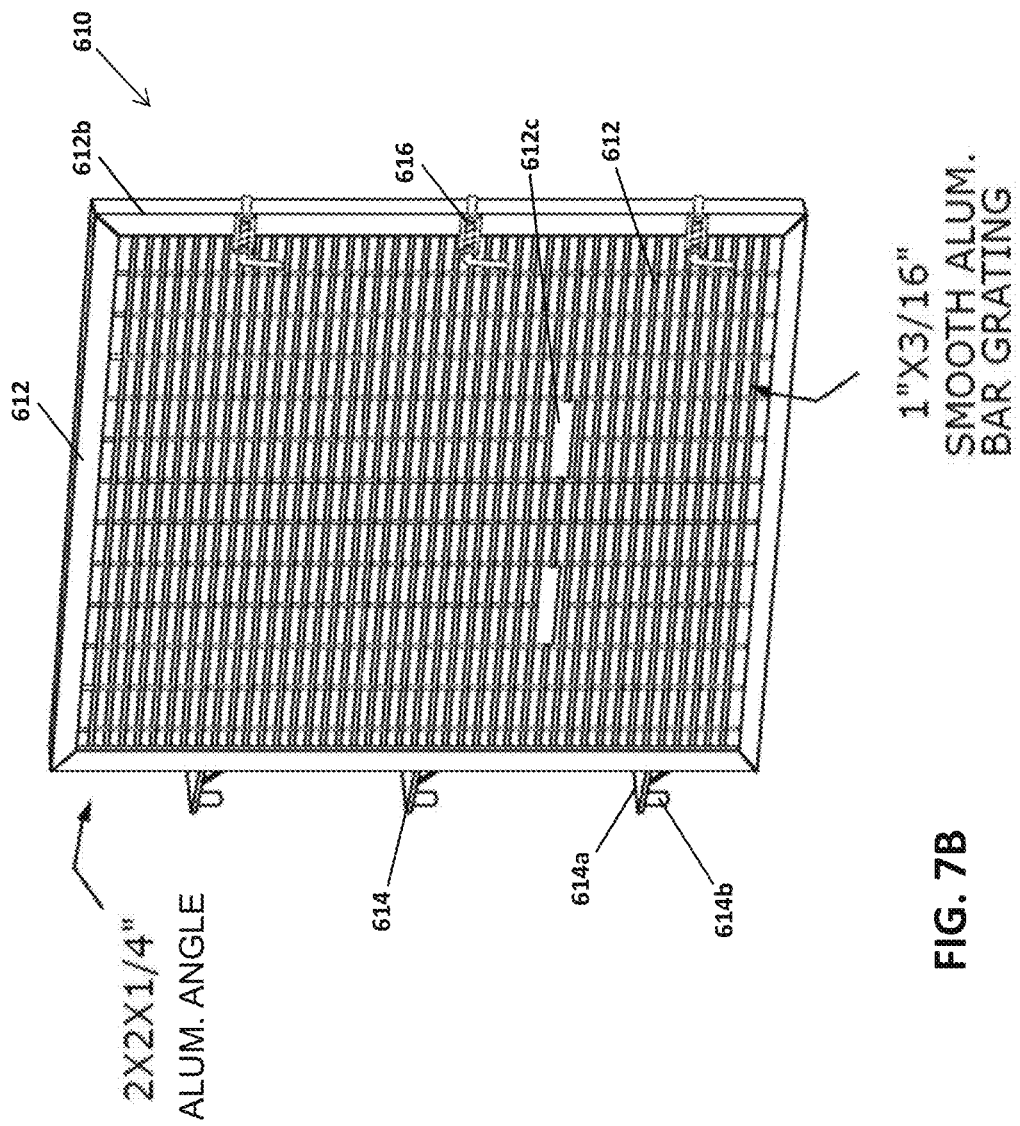
Figure 8:
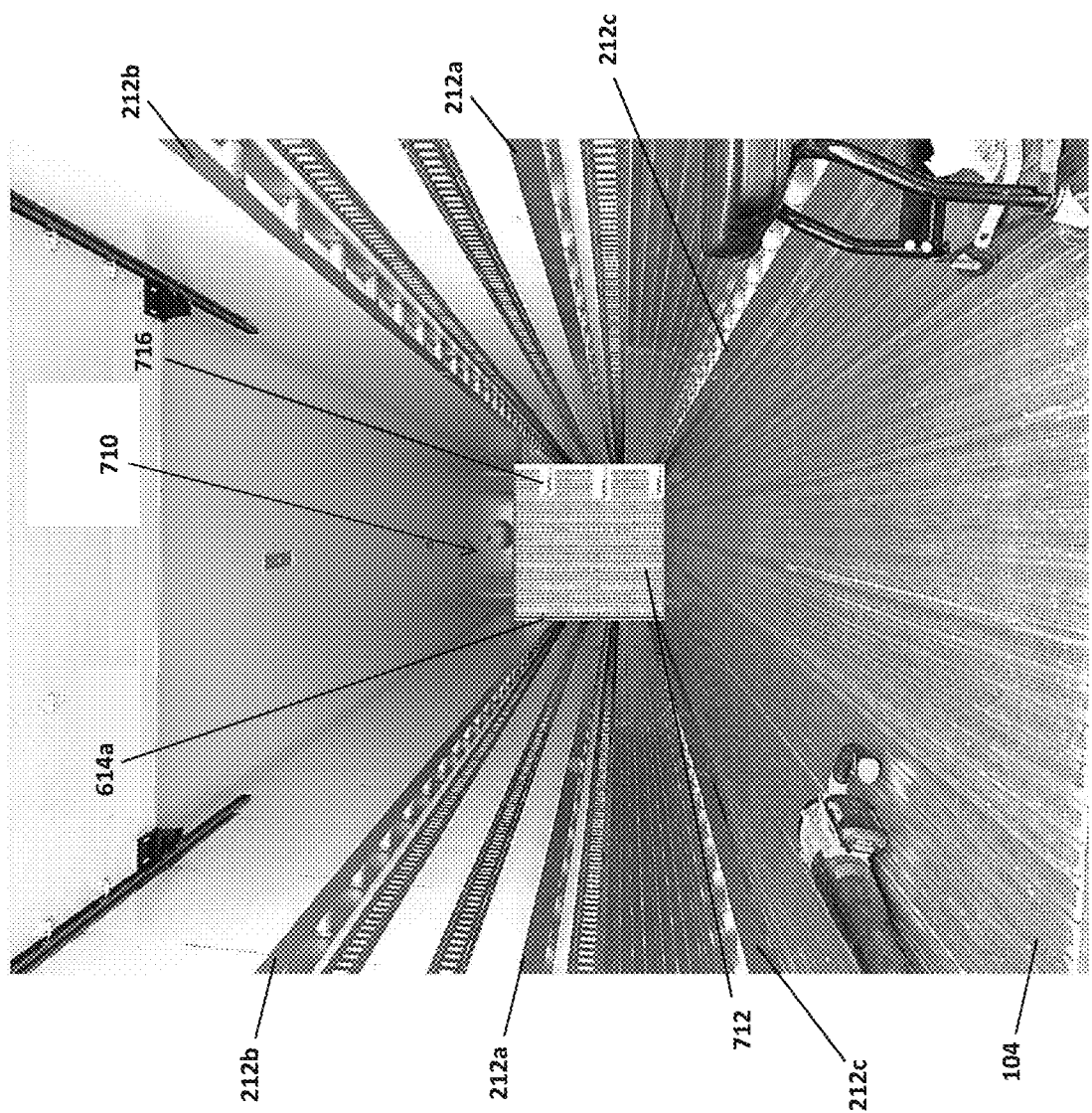

In the above-described embodiments, the conversion systems are used for adjusting the width dimensions of the trailer, and in some embodiments, may be used for adjusting the height dimensions of the trailer. The embodiments described above may be further modified so that the conversion system further includes an adjustable bulkhead for adjusting the inner length dimension of the trailer and for positioning and retaining freight within certain areas of the trailer lengthwise. As mentioned above, the adjustable bulkhead may be movable along the length of the trailer to change the inner length dimension of the trailer as needed, and may be used for retaining freight closer to the back of the trailer, or alternatively further away from the back of the trailer, either due to the size of the freight and/or due to the weight of the freight in order to balance the trailer after the freight is loaded and to efficiently haul the freight. FIGS. 7A and 7B show an exemplary adjustable bulkhead 610, and FIG. 8 schematically shows a modification to the trailer with the conversion system of FIG. 3 to include the adjustable bulkhead 610 of FIGS. 7A-7B.

As shown in FIGS. 7A-7B, the adjustable bulkhead 610 comprises a panel 612 configured to fit within the trailer with the bumpers installed thereon and to partition a portion of the space within the trailer. Specifically, the width of the panel 612 is selected so that sides of the panel 612 can attach to the bumpers installed on the sidewalls of the trailer in one embodiment, or to allow for attachment of the panel to the sidewalls of the trailer in another embodiment. In the illustrative embodiment shown in FIGS. 7A-7B and 8, the panel 612 is configured to attach to the bumpers that are movably attached to the sidewalls of the trailer. The height of the panel is equal to a portion of the height of the trailer, and is selected so as to sufficiently partition the space within the trailer and to retain freight within the partitioned space. In some illustrative embodiments, the panel 612 has a height equal to ½-1 of the internal trailer height, and more particularly equal to ⅔-¾ of the internal trailer height. In the embodiment shown in FIGS. 7A-7B, the panel 612 has a height of 76 inches for use with standard trailers that have an internal height of 103 inches, and a width of 84 inches for use with standard 102-inch wide trailers that have bumpers installed thereon to reduce the internal width to 92 inches. However, it is understood that the width and height of the panel 612 may be varied depending on the trailer dimensions and the dimensions of the bumpers.

In FIGS. 7A-7B, the panel is formed from aluminum, ridged polymer materials, or other metallic or polymer materials that have sufficient strength and are lightweight. The panel 612 in this example has aluminum bar grating 612a with one or more larger openings 612c in the bar grating, and a solid frame 612b surrounding the periphery of the bar grating. In certain embodiments, the bar grating 612a has small openings with exemplary dimensions of 1 inch by 3/16 inch. By using bar grating, the weight of the panel 612 is reduced and the larger openings 612c allow for grasping of the panel 612 during installation and movement of the panel 612.

As shown in FIGS. 7A-7B, the panel 612 includes an attachment mechanism for quickly and easily attaching or detaching the panel 612 to or from the trailer. In one illustrative embodiment, the panel 612 includes one or more hinges 614 for attachment of one side of the panel 612 to one sidewall of the trailer or to the bumpers installed on one sidewall of the trailer, and one or more lock fasteners 616 for attachment of the other side of the panel 612 to an opposing sidewall or the bumpers installed on the opposing sidewall of the trailer. As can be seen in FIGS. 7A-7B, each of the hinges 614 includes a plate 614a extending from a side of frame 612b and a pin 614b extending downwardly from the plate 614a, and each pin 614b is configured to engage with a respective bumper attached to the sidewall of the trailer. The hinges 614 allow the panel 612 to open and close similar to a door to allow access to a partitioned front portion of the trailer for cleaning or the like.

As shown in FIGS. 7A-7B, the lock fasteners 616 each include a spring-loaded locking pin which is configured to lock the panel 612 in place relative to the bumpers installed on the opposing side of the trailer or relative to the opposing sidewall of the trailer when the panel 612 is in a closed position. In certain embodiments, the bumpers and/or the opposing sidewall of the trailer include recesses placed in predetermined locations for accommodating the locking pin of the lock fasteners 616 so as to maintain engagement between the lock fasteners 616 and the bumpers and/or the opposing sidewall when the panel 612 is closed. It is understood that the lock fasteners 616 shown in FIGS. 7A-7B are illustrative and that other types of mechanical locks, magnetic locks, digital locks and/or other types of locks may be used for locking the panel 612 in position relative to the bumpers attached to the opposing sidewall of the trailer or relative to the sidewall of the trailer.

In the embodiment shown in FIGS. 7A-7B, the panel 612 includes three hinges 614 extending from one side wall and three lock fasteners 616 extending from an opposing sidewall, with a top hinge 614 and a top lock fastener 616 being positioned so as to engage with the second set of bumpers 112b, 212b attached to trailer sidewalls, a bottom hinge 614 and a bottom lock fastener 616 being positioned so as to engage with the lower set of bumpers 212c, and a middle hinge 614 and a middle lock fastener 616 being positioned so as to engage with the first set of bumpers 112a, 212a. In some embodiments, the panel includes two sets of hinges 614 and lock fasteners 616 and the bottom hinge and the bottom lock fastener may be eliminated, or the middle hinge and the middle lock fastener may be eliminated, or the top hinge or the top lock fastener may be eliminated.

FIG. 8 shows the adjustable bulkhead 710, such as the one shown in FIGS. 7A-7B, installed within a trailer that uses the conversion system of FIG. 3. As shown, the panel 712 of the adjustable bulkhead 710 is configured to partition the internal compartment of the trailer so that freight can be retained closer to the entry-side of the trailer. The adjustable bulkhead 710 can be moved closer to the entry-side of the trailer or further away from the entry-side and closer to the bulkhead of the trailer as needed based on the weight and dimensions of freight. In FIG. 8, the panel 712 of the adjustable bulkhead 710 includes hinges 714 configured to engage with the bumpers 212a-212c attached to one sidewall of the trailer, and lock fasteners 716 configured to engage with the bumpers 212a-212c attached to the opposing side of the trailer.

The hinges 714 can engage with the respective bumpers by slipping the pin of each hinge over the second bar of the respective bumper and are retained between adjacent posts of the respective bumper. In certain embodiments, additional posts with smaller spacing therebetween are provided in certain positions along the bumper so as to better retain the pins of the hinges. In other embodiments, the bumpers are modified to include engaging members along predetermined positions along the length of the bumper, the engaging members being specifically configured to accommodate and engage with the pins of the hinges 714 and to allow rotation of the pins relative thereto. An exemplary engaging member is a plate provided between the first and second bars of the bumper with an opening in the plate configured to receive the pin of the hinge 714.

The lock fasteners 716 are configured to engage with the bumpers attached to the opposing side of the trailer. In the embodiment shown, each spring-loaded locking pin may engage with an opening formed in the second bar of the respective bumper. Alternatively, each lock fastener 716 may be configured to latch onto the second bar of the respective bumper so as to lock its position relative to the bumper. In other embodiments, a tension lock or a magnetic lock may be used so that the lock fasteners 716 engage with and lock to the bumpers using tension or magnetic forces.

The above-described adjustable bulkhead may be used in trailers to create a movable front wall or bulkhead so as to partition the space within the trailer and/or to retain freight closer to the entry side of the trailer for balanced weight distribution. Since the adjustable bulkhead is movable, the partitioning can be customized to the specific needs of customers and different freight. In addition, since the adjustable bulkhead has the ability to open and close the panel, the trailer can be cleaned without having to remove the adjustable bulkhead. Moreover, the adjustable bulkhead can be used in a trailer on its own by engaging directly with the sidewalls of the trailer, or may be used together with the conversion systems described above and may engage with the bumpers of the conversion system.

The above-described embodiments of the conversion system allow existing standard trailers or semitrailers to be easily converted into dairy trailers or adapted for use with smaller, non-standard size freights. As a result, a single trailer can be used for multiple applications and for different types of freight, substantially improving the flexibility of use of the trailer and eliminating the need for special ordering of special use trailers, such as dairy trailers. In addition, by using the adjustable bulkhead for adjusting the usable length of the trailer, freight may be distributed within the trailer for better balancing of freight weight and for increasing the safety of transporting the freight. The adjustable bulkhead system is particularly useful for transportation of heavy products, such as dairy or other beverages, the weight of which requires them to be positioned further to the back, closer to the entry-side or doorway of the trailer.

In all cases, it is understood that the above-described arrangements are merely illustrative of the many possible specific embodiments which represent applications of the present invention. For example, the bumpers described above may be modified to have modifiable or adjustable dimensions, including length and/or width, by using telescoping components, such as telescoping first and second bars to increase or decrease the overall length of the bumpers or telescoping posts to increase or decrease the depth of the bumpers. In other embodiments, bumpers described above may be provided in multiple parts to make installation on the trailer and removal thereof from the trailer easier. Numerous and varied other arrangements, including use of different materials and varied dimensions of the bumpers, can be readily devised without departing from the spirit and scope of the invention.

The invention claimed is:

1. A conversion system for modifying internal dimensions of a semitrailer for use in hauling freight, the conversion system comprising:
    a plurality of first bumpers, each of the first bumpers being configured to removably attach to one of first and second opposing sidewalls of the semitrailer,
    wherein the plurality of first bumpers are configured to reduce an internal usable width of the semitrailer,
    wherein the plurality of first bumpers are configured to allow airflow around the freight within the semitrailer, and
    wherein each of the first bumpers comprises first and second elongated bars separated by at least one connector coupled to each of the first and second elongated bars, each of the first bumpers including at least one angled end formed by a gusset plate coupled to the first elongated bar and the second elongated bar.

2. The conversion system of claim 1, wherein the plurality of first bumpers are further configured to guide freight loading equipment into the semitrailer.

3. The conversion system of claim 1, wherein the plurality of first bumpers are formed from one of metallic materials and polymer materials.

4. The conversion system of claim 1, wherein the plurality of first bumpers are formed from one of aluminum and ridged plastic.

5. The conversion system of claim 1, wherein the at least one connector comprises a plurality of posts coupled to each of the first and second elongated bars.

6. The conversion system of claim 1, wherein the gusset plate extends at a 20-60 degree angle relative to the first elongated bar.

7. The conversion system of claim 1, wherein the first elongated bar is configured to removably attach to one of the first and second opposing sidewalls of the semitrailer and the second elongated bar is configured to face another one of the first and second opposing sidewalls of the semitrailer when the conversion system is installed in the semitrailer.

8. The conversion system of claim 1, wherein each of the first bumpers has a predetermined depth between 3 and 5 inches and is configured to reduce the internal usable width of the semitrailer by the predetermined depth.

9. The conversion system of claim 1, further comprising second bumpers having a different configuration from the first bumpers.

10. The conversion system of claim 9, wherein the second bumpers are configured to guide freight loading equipment into the semitrailer and wherein the second bumpers are configured to prevent freight from resting on top of the second bumpers.

11. A conversion system for modifying internal dimensions of a semitrailer for use in hauling freight, the conversion system comprising:
    a plurality of first bumpers, each of the first bumpers being configured to removably attach to one of first and second opposing sidewalls of the semitrailer, wherein the plurality of first bumpers are configured to reduce an internal usable width of the semitrailer, and wherein the plurality of first bumpers are configured to allow airflow around the freight within the semitrailer;
    one or more second bumpers having a different configuration from the plurality of first bumpers, wherein each of the second bumpers comprises a hat rail having a beveled upper corner.

12. The conversion system of claim 11, wherein each of the second bumpers includes a plurality of gusset members provided within a channel of the hat rail at predetermined intervals.

13. The conversion system of claim 11, wherein each of the second bumpers includes at least one angled end.

14. The conversion system of claim 1, further comprising a movable bulkhead configured to partition internal usable length of the semitrailer, wherein the movable bulkhead is configured to removably attach to one or more of (1) the plurality of first bumpers and (2) the first and second opposing sidewalls of the semitrailer.

15. A conversion system for modifying internal dimensions of a semitrailer for use in hauling freight, the conversion system comprising:
    a plurality of first bumpers, each of the first bumpers being configured to removably attach to one of first and second opposing sidewalls of the semitrailer, wherein the plurality of first bumpers are configured to reduce an internal usable width of the semitrailer, and wherein the plurality of first bumpers are configured to allow airflow around the freight within the semitrailer;
    a movable bulkhead configured to partition internal usable length of the semitrailer, wherein the movable bulkhead is configured to removably attach to one or more of (1) the plurality of first bumpers and (2) the first and second opposing sidewalls of the semitrailer,
    wherein the movable bulkhead comprises a panel, a plurality of hinges extending from one side of the panel and at least one lock fastener extending from an opposing side of the panel.

16. A semitrailer for hauling freight configured to attach to a tractor unit, the semitrailer comprising:
    an enclosed compartment and an axle assembly, the enclosed compartment including at least first and second opposing sidewalls extending from a floor;
    the conversion system in accordance with claim 1 for modifying internal dimensions of the enclosed compartment, the conversion system including the plurality of first bumpers, each of the first bumpers being configured to removably attach to one of the first and second opposing sidewalls of the enclosed compartment,
    wherein, when the plurality of first bumpers are attached to the first and second opposing sidewalls of the enclosed compartment, the plurality of first bumpers reduce an internal usable width of the enclosed compartment, and wherein the plurality of first bumpers allow airflow around the freight within the enclosed compartment.

17. The semitrailer according to claim 16, wherein the plurality of first bumpers are formed from one of metallic materials and polymer materials.

18. The semitrailer according to claim 16, wherein the at least one connector separating the first and second elongated bars comprises a plurality of posts coupled to each of the first and second elongated bars.

19. The semitrailer according to claim 8, wherein the at least one connector is configured to allow airflow between the first elongated bar and the second elongated bar.

20. The semitrailer according to claim 16, wherein the plurality of first bumpers include:
 a first pair of first bumpers configured to removably attach to the first and second opposing sidewalls of the enclosed compartment at a first predetermined height from the floor; and
 a second pair of first bumpers configured to removably attach to the first and second opposing sidewalls of the enclosed compartment at a second predetermined height from the floor greater than the first predetermined height.

21. The semitrailer according to claim 20, wherein the plurality of first bumpers further include:
 a third pair of first bumpers configured to removably attach to the first and second opposing sidewalls of the enclosed compartment at a third predetermined height from the floor smaller than the first predetermined height.

22. The semitrailer according to claim 20, wherein the conversion system further comprises a pair of second bumpers having a different configuration from the first bumpers and configured to removably attach to the first and second opposing sidewalls of the enclosed compartment at a third predetermined height from the floor smaller than the first predetermined height.

23. The semitrailer according to claim 16, wherein the conversion system further includes second bumpers having a different configuration from the first bumpers.

24. The semitrailer according to claim 23, wherein each of the second bumpers comprises a hat rail having a beveled upper corner.

25. The semitrailer according to claim 16, further comprising a movable bulkhead configured to partition internal usable length of the trailer, wherein the movable bulkhead is configured to removably attach to one or more of the plurality of first bumpers and the first and second opposing sidewalls of the semitrailer.

26. The conversion system of claim 1, wherein the at least one connector is configured to allow airflow between the first elongated bar and second elongated bar.

27. A semitrailer for hauling freight configured to attach to a tractor unit, the semitrailer comprising:
 an enclosed compartment and an axle assembly, the enclosed compartment including at least first and second opposing sidewalls extending from a floor;
 a conversion system for modifying internal dimensions of the enclosed compartment, the conversion system including:
 a pair of first bumpers, each of the first bumpers being configured to removably attach to the first and second opposing sidewalls of the enclosed compartment at a first predetermined height from the floor; and
 a pair of second bumpers having a different configuration from the first bumpers and configured to attach to the first and second opposing sidewalls of the enclosed compartment at a second predetermined height from the floor smaller than the first predetermined height,
 wherein, when the pair of first bumpers and the pair of second bumpers are attached to the first and second opposing sidewalls of the enclosed compartment, the pair of the first bumpers and the pair of the second bumpers reduce an internal usable width of the enclosed compartment,
 wherein the pair of first bumpers allow airflow around the freight within the enclosed compartment,
 wherein each of the first bumpers comprises first and second elongated bars separated by at least one connector coupled to each of the first and second elongated bars, and
 each of the first bumpers includes at least one angled end formed by a gusset plate coupled to ends of the first elongated bar and the second elongated bar.

28. The semitrailer in accordance with claim 27, wherein the at least one connector is configured to allow airflow between the first elongated bar and second elongated bar.

29. The semitrailer in accordance with claim 27, wherein each of the second bumpers comprises a rail having a beveled upper corner configured to prevent freight from resting on top of the second bumper.

* * * * *